Feb. 8, 1938.  J. SCHAAF  2,107,909
CENTRIFUGE
Filed Jan. 30, 1935   2 Sheets-Sheet 1
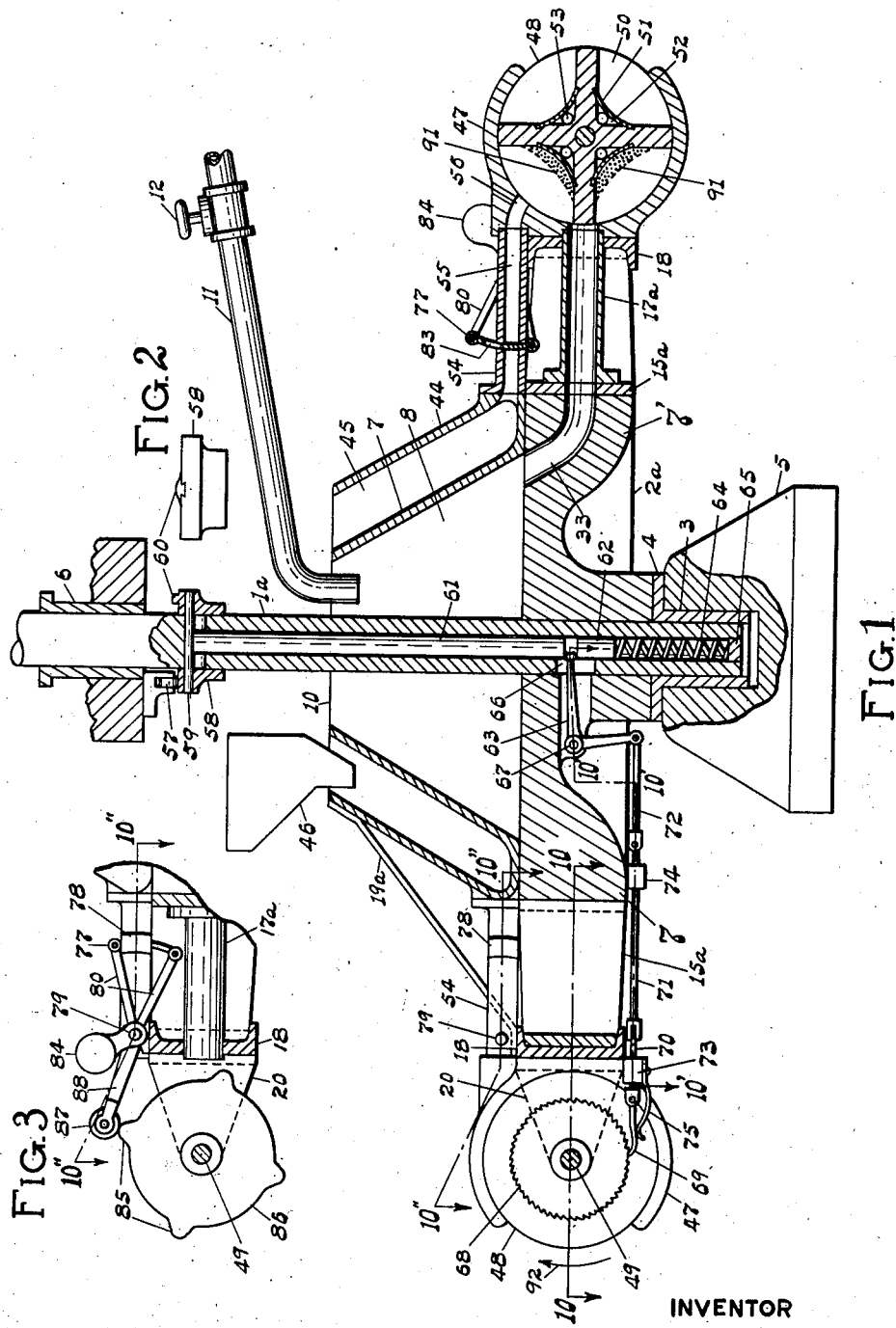
INVENTOR
John Schaaf
BY
Lucian B. Jackson
ATTORNEY Patented Feb. 8, 1938

2,107,909

UNITED STATES PATENT OFFICE 2,107,909

CENTRIFUGE

John Schaaf, Buffalo, N. Y.

Application January 30, 1935, Serial No. 4,107

11 Claims. (Cl. 210—73)

My invention relates to means for quickly separating the excess moisture from sewage sludge or screenings and more particularly to centrifugal means for so doing.

Sewage solids or sludge from a sewage treatment plant where said solids or sludge is collected in a settling tank, or the solids collected from a screen, contain a large percentage of water. Where said solids or sludge is to be disposed of by dehydrating sufficiently for use as a fertilizer or in an incinerator, it requires considerable fuel to get rid of the excess moisture.

One method of preliminary drying is to spread the sludge or solids over drying beds and allowing it to dry out, which takes considerable time and a larger area than is always conveniently available in congested districts.

The principal object of my invention is to provide means for centrifugally separating considerable of the moisture from sewage solids or sludge.

Another object is to provide means for separating a percentage of the moisture from sewage solids or sludge by making as nearly as possible a continuous operation from collecting the solids or sludge to its disposal.

With the foregoing and other objects in view which will appear as the description proceeds, the invention consists in certain features of novelty in the construction, combination and arrangement of parts by which the said objects are attained, the invention being more particularly pointed out in the claims.

It will be understood that my device may be used for the separation of any solids from liquids and that various changes may be made in the construction and arrangement of parts without departing from the spirit or sacrificing any of the advantages of the invention as set forth in the appended claims.

Referring to the drawings:

Fig. 1 is a vertical sectional elevation of a centrifuge and sectioned on the lines 7—7 and 7'—7' of Fig. 4, showing buckets adapted to be rotated by the motion of the centrifuge, with means for feeding a filtering medium into said buckets and means for feeding sewage matter into said buckets and continuously discharging the separated liquids and intermittently discharging the solids from said sewage matter.

Fig. 2 is a side elevation of a collar and cam shown in section in Fig. 1.

Fig. 3 is a sectional elevation on line 9—9—9—9 of Fig 4 (with the bucket removed) showing mechanism for opening and closing a valve to control the feeding of filtering medium to the sewage separating bucket.

Figure 4:
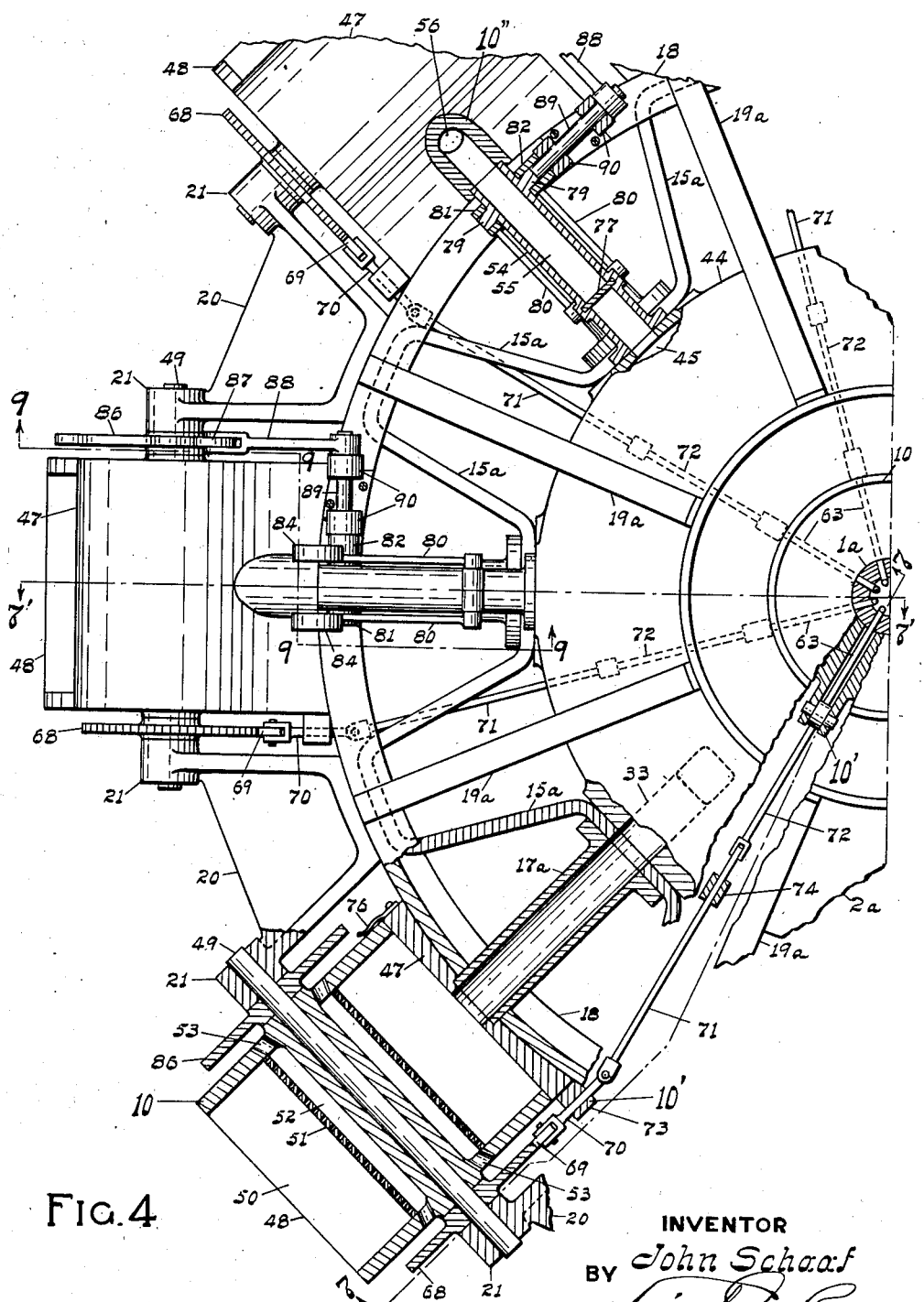

Fig. 4 is a plan of a portion of the modification of Fig. 1 and partially sectioned at places marked 10, 10' and 10" which are on the lines 10—10, 10'—10'—10', and 10"—10" of Fig. 1.

For a continuous operation of dehydrating sewage a centrifuge is provided as shown in Figs. 1 to 4 and with means for supplying a filtering medium to assist in filtering the sewage as well as to prevent clogging of the screen. The filtering medium employed can be of any suitable granulated material as sand, crushed stone or other material to be disposed of with the sewage solids or to be recovered and used again. The filtering material can also be a granulated coal or the like to furnish combustible material when it is desired to burn the sewage solids.

In Figs. 1 to 4, 1a is the shaft to which the body 2a is fastened for rotation. 3 is the shaft lower bearing mounted in pedestal 5 and having flange 4 for supporting body 2a while 6 is the shaft upper bearing. 7 is a hollow truncated cone forming a chamber 8 and mounted on top of the body 2a. Pipe 11 projects into the opening 10 for introducing the sewage matter into chamber 8 and having a control valve 12. The hollow truncated cone 7 is surrounded by another hollow truncated cone 44 leaving an annular space between said cones to provide a chamber 45 to hold a filtering medium to be introduced by means of a spout 46.

The channel 18 in the form of a ring is fastened to body 2a by means of a support 15a which contacts alternately with the periphery of said body 2a and the inside of channel 18. Between the top of channel 18 and the cone 44 are braces 19a. Fastened to and spaced around the periphery of the channel 18 are brackets 20, 20 etc., with two bearings 21 to each bracket. Also fastened to the periphery of channel 18 and spaced between each two brackets 20 is a housing 47 shaped in the form of a ring as viewed from the side in Fig. 1 but with a portion cut away opposite the channel 18. Bucket 48 fits in and rotates in housing 47 by means of shaft 49 which rotates in bearings 21. The bucket 48 is shaped like a spool with end walls and a hub and partitioned lengthwise of the hub to divide it into quarters to form four chambers 50 each of which is open on the periphery of said bucket and spanned near the center by a screen 51 to form a space 52 having holes 53 in the end walls through which liquid can be discharged.

54 is a tube having a passage 55 communicating with the passage 56 in housing 47 and the annular chamber 45 in cone 44 for conveying filtering medium from chamber 45 into chamber 50. The passage 33 in body 2a opens at its upper end into the chamber 8 and at its lower end into the tube 17a through the support 15a to communicate with the chambers 50 of the rotating bucket 48 in housing 47. As a means for rotating the buckets 48 a roller 57 is supported near the upper bearing 6. A collar 58 adapted to slide vertically on the outside of shaft 1a and bear against the roller 57 is pinned through vertical slots by means of pin 59. 60 is a cam on collar 58 for contacting with roller 57 at each rotation of shaft 1a and collar 58.

The cam 60 is shown demountably attached to collar 58 by means of a groove to allow for substituting cams of different size and two or more of such grooves are provided to allow for using more than one cam as desired. The lower end of shaft 1a is hollow and holds a long upper rod 61 and a short lower rod 62 between which rests the end of the horizontal arm of bell crank 63. The collar 58 is held in contact with the roller 57 by means of the spring 64 acting through the short rod 62, end of the horizontal arm of bell crank 63, long rod 61 and pin 59. 65 is a plug to close the end of shaft 1a and support the spring 64.

The horizontal arm of bell crank 63 extends through a slot 66 in shaft 1a and is pivoted at 67 in the body 2a. The toothed wheel 68 is fastened on shaft 49 for rotating bucket 48 and is operated by the ratchet pin 69 which is connected to the vertical arm of the bell crank 63 by means of the pivoted rods 70, 71 and 72 supported in bearings 73 and 74. 75 is a spring for holding ratchet pin 69 in operative contact with the teeth of the wheel 68. The bucket 48 fits in the housing 47 with sufficient friction to hold it stationary except as rotated by the wheel 68 and as the housing 47 and bucket 48 wear additional friction is supplied by means of a spring 76 bearing against end of bucket 48 (section of bucket 48 in Figure 4).

In the centrifuge shown in Figs. 1 to 4 no valve is shown between the rotating bucket 48 and the chamber 8 as the sewage flow is controlled by the valve 12 in the pipe 11. When an automatic valve is desirable the valve 77 is used in the tube 17a to allow for sewage flow through passage 33 during rotation of the centrifuge and stop flow when centrifuge stops.

For feeding the filtering medium from the chamber 45 to the bucket chambers 50, a valve 77 is provided in the tube 54. Referring to Figs. 1 to 4, the valve 77 is flat and in the form of an arc of a circle to slide through the housing 78 and pivoted at 79, 79 by means of arms 80, 80 and hubs 81, 82. 83 is a port through valve 77 to register with the passage 55 of the tube 54 to open said valve 77. 84, 84 are weights connected to hubs 81, 82 to keep the valve 77 closed at all times except when opened by the cams 85 (one of which is provided for each chamber 50) on wheel 86 which is fastened on bucket shaft 49. 87 is a roller on arm 88 attached to shaft 89, and which is also attached to hub 82, for opening valve 77 when roller 87 is raised by one of the cams 85. The shaft 89 operates through bearings 90, 90 (Fig. 4).

In Fig. 1 the valve 77 is shown closing the passage 55 and in Fig. 3 the valve 77 is shown in position for opening the passage 55 in tube 54.

In the sectional view of the bucket 48 in Fig. 1 a medium 91 (as fine coal) is shown covering the screen 51. The medium 91 can be used dry but is preferably carried in water for free flowing and is introduced in the correct quantity by proper timing of the duration of the opening of valve 77. The use of water in carrying the medium is also of advantage in that the water draining through the screen 51 leaves the medium in proper position on the screen where desired for collecting the solids from the sewage.

The operation of the centrifuge and the rotating buckets 48 is as follows:

The centrifuge is rotated by its shaft 1a, medium fed into chamber 45 and sewage into chamber 8. The buckets 48 are rotated in the direction shown by the arrow 92. At each rotation of the shaft 1a and the collar 58 the cam 60 contacts with roller 57 to slide said collar 58 down on shaft 1a and by means of pin 59 to depress rod 61, end of horizontal arm of bell crank 63 and rod 62 against the spring 64, and in so doing operate the toothed wheel 68 and the bucket 48 by means of the ratchet pin 69 and rods 70, 71 and 72 connected to bell crank 63. As soon as the cam 60 passes roller 57 the return movement of the operating parts just enumerated will be accomplished by the spring 64.

In rotating bucket 48 a chamber 50 is first brought into position to receive the filtering medium from chamber 45 when the valve 77 is opened by the cam 85 and wheel 86 and then closed by the weights 84 actuated by centrifugal force. Weights 84 are located to keep valve 77 closed by gravity acting on said weights when the centrifuge is at rest. The water carrying the filtering medium is drained through the screen 51 leaving the medium 91 covering said screen 51. On further rotation of bucket 48 chamber 50 is brought into position to receive the sewage matter from chamber 8 through passage 33 and tube 17a. The sewage liquid is discharged through the filtering medium 91, the screen 51, space 52 and holes 53. After the chamber 50 passes the position to receive sewage from chamber 8 the balance of moisture in the sewage is discharged from said chamber 50 by the centrifugal force created by the rotating centrifuge and upon rotation of the bucket 48 to bring chamber 50 to the cut away outer portion of housing 47 the sewage solids collected together with the filtering medium are discharged by being thrown out by the centrifugal action of the rotating centrifuge.

As the centrifuge rotates several hundred times a minute the toothed wheel 68 is proportioned to rotate buckets 48 to discharge sewage solids from chambers 50 as often as desired.

Having thus described my invention, I claim:

1. A centrifuge including a body, means to rotate said body, a chamber on said body, means to introduce sewage matter into said body chamber, means to control the flow of sewage matter into said body chamber, a bucket supported opposite the periphery of said body, a chamber formed by longitudinal partitions meeting at an angle in the center of said bucket, connecting passage means from said body chamber to said bucket chamber, means to rotate said bucket to bring said bucket chamber into communication with said passage means to receive sewage matter from said body chamber, a screen in said bucket chamber across the center angle formed by said partitions to retain the solids from the sewage matter and discharge the liquid therefrom, passage means to discharge the liquid from said bucket and means to discharge the solids from said bucket chamber.

2. A centrifuge including a body, a chamber for sewage matter on said body, a chamber for filtering medium on said body, means to introduce sewage matter into said sewage chamber, means to introduce filtering medium into said filtering medium chamber, a bucket supported opposite the periphery of said body, a chamber in said bucket, connecting passage means from said body sewage chamber to said bucket chamber, connecting passage means from said body filtering medium chamber to said bucket chamber, means to rotate said bucket to bring said bucket chamber into and out of communication with said body filtering medium chamber and said body sewage chamber, a screen in said bucket chamber, and means to rotate said body and centrifugally discharge first the liquid from the sewage matter and second the filtering medium and sewage solids.

3. A centrifuge including a body, a chamber for sewage matter on said body, a chamber for filtering medium on said body, means to introduce sewage matter into said sewage chamber, means to introduce filtering medium into said filtering medium chamber, a bucket supported opposite the periphery of said body, a chamber in said bucket, connecting passage means between said body sewage chamber and said bucket chamber, connecting passage means between said body filtering chamber and said bucket chamber, means to rotate said bucket to bring said bucket chamber first into communication with said body filtering medium chamber to receive filtering medium and second into communication with said body sewage chamber to receive sewage matter, a screen in said bucket chamber, means to rotate said body and centrifugally discharge first the liquid and second the filtering medium and sewage solids and means to control the feeding of filtering medium from said body filtering medium chamber to said bucket chamber.

4. A centrifuge including a body, a chamber for sewage matter on said body, means to introduce sewage matter into said sewage chamber, a chamber for filtering medium on said body, means to introduce filtering medium into said medium chamber, a bucket rotatably mounted adjacent said body, a chamber in said bucket, a screen in said bucket chamber, passage means between said body sewage chamber and said bucket chamber, passage means between said body medium chamber and said bucket chamber, a valve in said medium passage, cam means to open and centrifugal means to close said valve, means to rotate said bucket to receive filtering medium and then sewage matter into its chamber from the said body medium chamber and the said body sewage chamber and means to rotate said body and centrifugally separate the liquid from the solids of the sewage matter by means of said screen and centrifugally discharge the separated liquid and solids.

5. A centrifuge including a body, a chamber for a liquid mixture on said body, a chamber for filtering medium on said body, a bucket mounted adjacent said body, a screen in said bucket, passage means between said body sewage chamber and said bucket, passage means between said body medium chamber and said bucket, means to rotate said body and means to rotate said bucket, said bucket rotating means operated by the rotation of said body whereby filtering medium and sewage matter are fed into said bucket and whereby the rotation of said body separates the liquid from the sewage solids and separately discharges the liquid and solids from said bucket.

6. A centrifuge including a body, chamber means on said body to separately hold a liquid mixture and filtering medium, a bucket mounted adjacent said body chambers in said bucket, a screen in each chamber in said bucket, separate passage means for a liquid mixture and a filtering medium from said body chamber to said bucket, means to rotate said body to separately feed first filtering medium and second liquid mixture into each chamber of said bucket and centrifugally discharge the liquid through its screen and from said bucket and means to operate said bucket and discharge the filtering medium together with the solids collected by each screen.

7. A centrifuge including a body, a sewage chamber on said body, a chamber for a filtering medium mixture on said body, a bucket mounted adjacent said body, a screen in said bucket, passage means between said sewage chamber and said bucket, passage means between said medium chamber and said bucket, means to rotate said body, means to operate said bucket from the rotation of said body to first receive filtering medium mixture and then sewage and valve means actuated by the operation of said bucket to control the feeding of filtering medium mixture to said bucket, said bucket operated by the rotation of said body.

8. A centrifuge including a body, a liquid mixture chamber on said body, a housing mounted adjacent said body, a bucket rotatably mounted in said housing, means to form multiple chambers in said bucket, a screen in each of said bucket chambers, passage means connecting said body chamber and said bucket, means to form a discharge opening in said housing opposite said passage means, means to rotate said body, means to rotate said bucket from the rotation of said body and bring each of its chambers in succession first into communication with said body chamber to receive mixture from said mixture chamber and then into communication with said housing discharge opening to discharge the solids from said mixture.

9. A centrifuge including a body, a shaft, means to rotate said shaft and body, a chamber for sewage matter on said body, means to introduce sewage matter into said body chamber, a bucket supported opposite the periphery of said body, partition means longitudinally dividing said bucket into chambers, liquid discharge passage means from each chamber adjacent the center of said bucket to form a continuous liquid discharge, means to screen the liquid discharge passage in each chamber, passage means from said body chamber to said bucket, means to rotate said bucket to bring said bucket chambers alternately into communication with said body chamber passage means to receive sewage matter from said body chamber and means to discharge the resultant sewage solids from one of said bucket chambers during the sewage feeding into another of said bucket chambers.

10. A centrifuge including a body, a chamber for a liquid mixture on said body, buckets mounted adjacent said body, chambers in each bucket formed by partitions extending longitudinally of said bucket and meeting in the center of said bucket to inclose a central angle in each chamber, a screen across the central angle of each chamber, a liquid discharge passage from the angle bottom in each chamber, feeding passage means between said body chamber and each of said buckets, means to rotate said body to centrifugally feed liquid mixture into said buckets and discharge the liquid through said screens and from said buckets and means to operate said buckets and centrifugally discharge the solids collected on said screens.

11. In a centrifuge for utilizing a filtering medium, the combination, of a body, means to rotate said body, a chamber for said filtering medium on said body, means to introduce said filtering medium into said body chamber, a bucket mounted adjacent said body, a chamber in said bucket, a screen in said bucket chamber, connecting passage means from said body chamber to said bucket chamber, valve means in said connecting passage means, means to open said valve and means to close said valve.

JOHN SCHAAF.